F. ELLWEIN.
STEERING DEVICE FOR MOTOR VEHICLES.
APPLICATION FILED MAY 18, 1917.
1,337,830.
Patented Apr. 20, 1920.
2 SHEETS—SHEET 2.
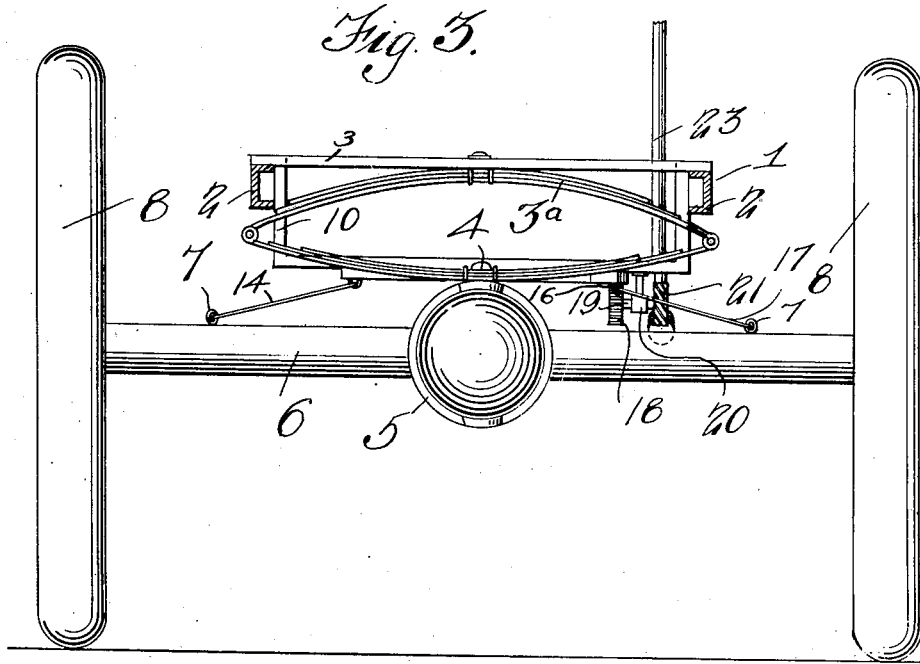
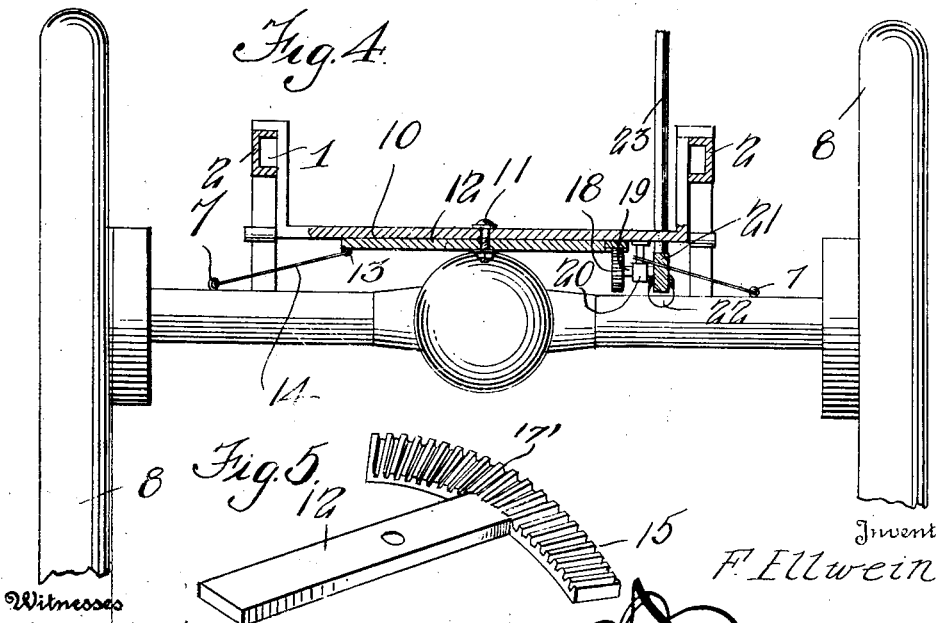

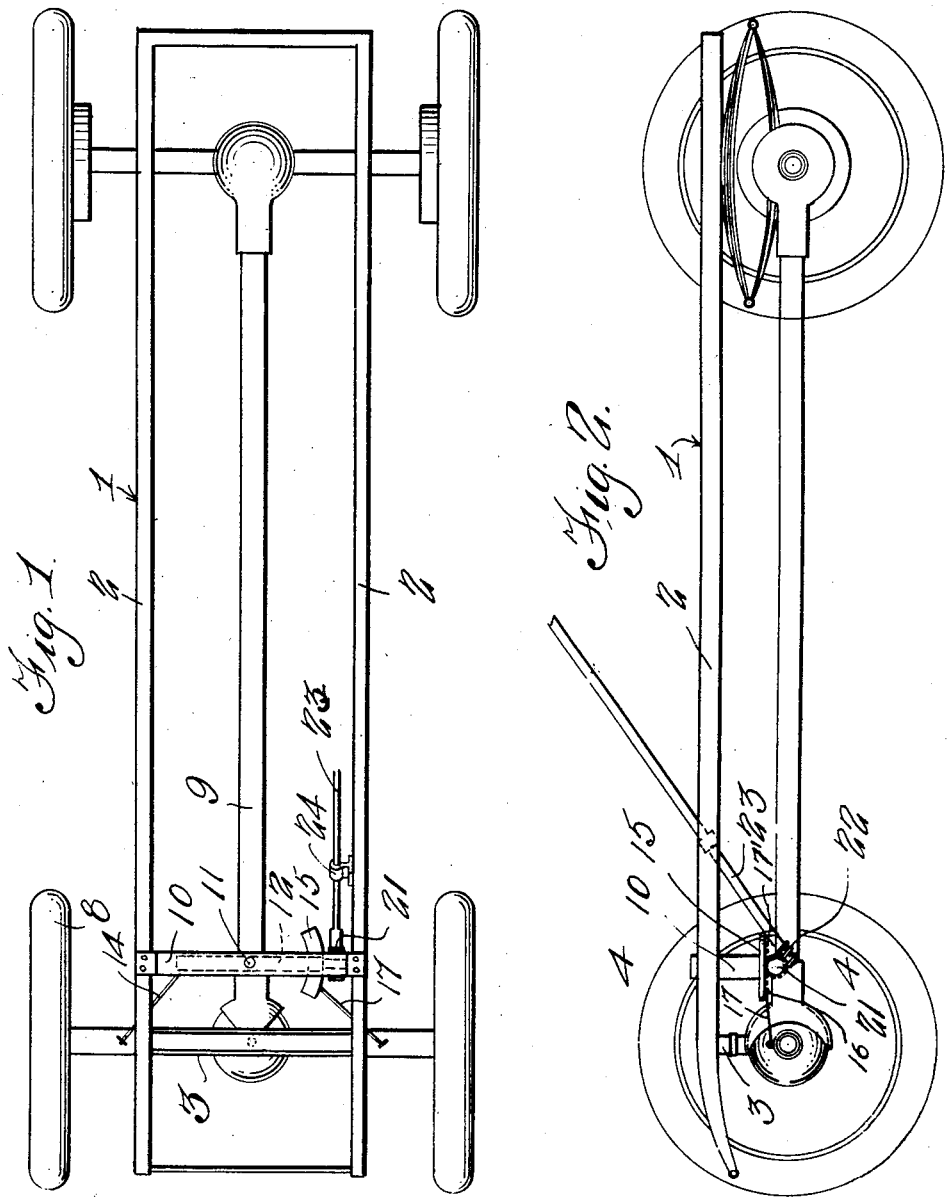

ized.

UNITED STATES PATENT OFFICE.

FREDERICK ELLWEIN, OF HAZEN, NORTH DAKOTA.

STEERING DEVICE FOR MOTOR-VEHICLES.

1,337,830. Specification of Letters Patent. Patented Apr. 20, 1920.

Application filed May 18, 1917. Serial No. 169,462.

*To all whom it may concern:*

Be it known that I, FREDERICK ELLWEIN, a citizen of the United States, residing at Hazen, in the county of Mercer and State of North Dakota, have invented certain new and useful Improvements in Steering Devices for Motor-Vehicles; and I do hereby declare the following to be a full, clear, and exact description of the invention, such as will enable others skilled in the art to which it appertains to make and use the same.

This invention relates to new and useful improvements in steering devices for motor vehicles, and the principal object of the invention is to provide a device which is particularly adapted for use in connection with front wheel drive types of motor vehicles.

Another object of the invention is to provide a device in which the front wheel axle is swivelly mounted at a point centrally of the forward end of the chassis.

A further object of the invention is to provide a device which is so constructed as to relieve the arms and hands of the driver of the vehicle of any unnecessary strain.

With the foregoing and other objects in view this invention consists in such novel features of construction, combination and arrangement of parts as will be hereinafter more fully described, illustrated in the accompanying drawings, and claimed.

In describing the invention in detail reference will be had to the accompanying drawings wherein like characters designate like and corresponding parts throughout the several views, and in which:

Figure 1 is a top plan view of a chassis, showing this invention applied thereto, Fig. 2 is a side elevation of Fig. 1, Fig. 3 is a front end elevation of a chassis, showing this device applied thereto, Fig. 4 is a transverse sectional view on the line 4—4 of Fig. 2, and Fig. 5 is an enlarged detail perspective view of the steering bar.

Referring to the drawings, 1 designates a chassis comprising side bars 2, which are connected at their forward ends by a transversely extending bar 3, having attached thereto an elliptical spring 3ª, which is in turn mounted by means of a suitable pivot 4 upon the differential housing 5 of the front axle 6. This front axle has attached near its outer ends eyes 7, the use of which will appear as the description proceeds. The usual wheels 8 are mounted on the front axle and are adapted to be driven by a shaft extending through said axle, which is connected at its inner ends to a differential within the housing 5, which in turn is driven by a propeller shaft mounted in the housing 9, which extends throughout the length of the vehicle.

Secured to the side bars 2 of the chassis, slightly in rear of the bar 3, is a transversely extending connecting bar 10, carrying centrally thereof a pivot 11, to which is pivotally connected a bar 12, carrying at one end an eye 13, which is connected by a link 14 to one of the eyes 7. The opposite end of the bar 12 is formed with an arcuate rack 15, carrying at one end an eye 16, which is connected by a link 17 to the opposite eye 7. The under side of the arcuate bar 15 is provided with rack teeth 17', which are adapted to mesh with a pinion 18 attached to one end of a shaft 19, which is mounted in a bracket 20 secured to the under side of the bar 10. As shown in the drawings this bar 10 is substantially U-shaped in order to drop the bar 12 to a point below the chassis in order to bring the same nearer the axle.

The end of the shaft 19 opposite that carrying the pinion 18 is provided with a worm wheel 21, which meshes with a worm 22, which is mounted on the lower end of the steering rod 23. This steering rod is rotatably mounted in a suitable bracket 24 attached to one of the side bars 2 of the chassis, and the upper end of said rod carries the usual steering wheel, not shown.

It will be apparent from the foregoing that in use power is transmitted to the front as well as the rear wheels of the vehicle and when it is desired to turn the steering wheel is operated, thereby rotating the shaft 23 and causing the worm wheel 21 to rotate, thereby operating the pinion 18 and swinging the bar 12 on the pivot 11. Said swinging movement will exert a pull on one or the other of the links 14 or 17, and thereby cause the axle 6 to swing on its pivot in the desired direction. Thus the essential advantage of the invention resides in the fact that in connection with a machine having a front wheel drive there is provided simple means mounted upon the chassis frame whereby direct connection with the arms of the front or steering axle is secured under such conditions as to constitute a self locking means in all positions of adjustment of the steering axle and hence of the steering wheel by reason of the fact that the worm which is carried by the steering post prevents any transmissison of motion from the steering bar 12 to said post. This relieves the hands of the operator of much of the strain incident to the operation of the machine while a sufficient yielding relation between the parts necessary to compensate for any jar due to the meeting of the steering wheels with obstacles on the road surface is taken up by the tensile connections between the terminals of the steering bar and the arms of the steering axle and obviously the transverse resilience of the steering bar, without involving an injurious strain upon the means by which the steering bar is adjusted in the proper direction of the machine.

While in the foregoing description, the principle of the operation of this invention has been described, together with various features of construction, it is to be understood that certain minor features of construction, combination and arrangement of parts may be altered to suit practical conditions provided such alterations are comprehended within the scope of what is claimed.

What I claim is:

1. In a device of the class described the combination with a vehicle chassis having a front wheel drive and including a front swinging axle, of steering mechanism consisting of a pivotal steering bar, links pivotally connecting the terminals of the bar with the front axle on each side of the pivot point thereof, an arcuate rack bar formed on one end of the steering bar, a pinion mounted upon the chassis to mesh with the rack bar, and worm and worm gear means for actuating the pinion, the worm being operated by the steering post.

2. In a device of the class described, the combination with a vehicle chassis having a front wheel drive and including a front axle pivoted intermediate its ends to the chassis and steering mechanism consisting of a pivoted steering bar mounted upon the chassis frame and having terminal tensile connection with the front axle on each side of the pivot point thereof and carrying an arcuate rack, a pinion mounted upon the chassis frame in mesh with the rack, and worm and worm gear means for actuating the pinion, the worm being carried by the steering post.

In testimony whereof I affix my signature in presence of two witnesses.

FREDERICK ELLWEIN.

Witnesses:
 ORA E. SAHR,
 J. OSMAN.